(12) United States Patent
Weinans

(10) Patent No.: US 7,431,216 B2
(45) Date of Patent: Oct. 7, 2008

(54) METHODS FOR PRESENTING PARAMETER STATUS INFORMATION AND RELATED PORTABLE ELECTRONIC DEVICES AND PARAMETERS

(75) Inventor: Erwin Geert Hendrik Weinans, Klijndijk (NL)

(73) Assignee: Sony Ericsson Mobile Communications AB, Lund (SE)

( * ) Notice: Subject to any disclaimer, the term of this patent is extended or adjusted under 35 U.S.C. 154(b) by 324 days.

(21) Appl. No.: 11/280,159

(22) Filed: Nov. 16, 2005

(65) Prior Publication Data

US 2007/0109258 A1    May 17, 2007

(51) Int. Cl.
*G06K 7/10* (2006.01)
(52) U.S. Cl. .................. 235/472.01; 235/375; 345/156; 345/158
(58) Field of Classification Search ............ 235/472.01, 235/375, 472.02; 345/156, 158
See application file for complete search history.

(56) References Cited

U.S. PATENT DOCUMENTS 5,939,861 A * 8/1999 Joko et al. ............... 320/122
6,798,429 B2 * 9/2004 Bradski .................... 345/156
2004/0201595 A1  10/2004 Manchester
2004/0239626 A1 * 12/2004 Noguera ................... 345/158
2005/0116045 A1 *  6/2005 Chang .................. 235/472.03
2005/0258229 A1 * 11/2005 Minemura ................ 235/375

FOREIGN PATENT DOCUMENTS

WO    WO01/27727 A2    4/2001
WO    WO2005/069593 A   7/2005

OTHER PUBLICATIONS

International Search Report, PCT/EP2006/068010; Feb. 5, 2007.

* cited by examiner

*Primary Examiner*—Edwyn Labaze
(74) *Attorney, Agent, or Firm*—Myers Bigel Sibley & Sajovec

(57) ABSTRACT

A device for indicating a present status for a certain parameter, such as the charge of a battery. A parameter-sensing unit devised to sense a parameter value is connected to a control unit, devised to present an indicator area on a display. The indicator area is defined within an indicator frame, and an area portion of the indicator area is marked to represent a relative parameter level. A gyro sensor is connected to the control unit, wherein the control unit is devised to present the marked area portion as a bottom portion of the indicator area with a gyro-controlled upper border of the area portion which is maintained substantially horizontal. This way, the marked area portion will be experienced as a fluid, confined within a jar represented by the indicator frame.

18 Claims, 5 Drawing Sheets

METHODS FOR PRESENTING PARAMETER STATUS INFORMATION AND RELATED PORTABLE ELECTRONIC DEVICES AND PARAMETERS

FIELD OF THE INVENTION

The present invention relates to indicators usable for indicating the present status for a parameter, which can assume a value between two endpoints. More specifically, some embodiments of the invention relate to electronic devices having a power supply source, such as a battery, and to solutions for visualizing a present charge in the power supply source. The invention is particularly suitable for portable devices, such as mobile phones.

BACKGROUND

Many electric devices, electronic devices and computer devices operate dependent on one or more parameters, where a present value or level of the parameter is important for the performance of the device or otherwise provides useful information to an operator or user. Examples of such parameters include a battery charge level, a power level, a drain rate level, a pressure level, a memory level, and so on. Many of such parameter values can assume a value between two endpoints, typically a minimum value and a maximum value. Furthermore, it is in many cases sufficient, or even more lucid, to present a present parameter level as a relative measure with reference to one or both endpoints, rather than presenting the actual parameter value. A typical example of such a parameter type is a battery charge level. Whereas it is generally easy for a user to grasp a visualization of the relative charge level between endpoints representing "empty" and "full", an actual charge level indication given in, for example, mAh, will provide little information to an user of ordinary skill. In computer games, corresponding presentation of relative parameter levels are often used for indicating levels of skill, strength, health and so on.

FIG. 1 illustrates a typical conventional solution for presenting a battery charge level for a battery connected to a mobile phone having a display 11. The present charge level of the battery is shown on display 11 by means of a battery indicator 12. The battery indicator comprises a frame designed to resemble a traditional battery, and the present charge level is indicated by filling the frame to a degree corresponding to the charge level. A filled frame corresponds to full capacity, whereas an empty frame corresponds to an empty battery, and the present charge level shown in FIG. 1 represents a little less than half-full battery.

Graphical user interfaces (GUI) have been used for quite some time in electronic devices for enhancing user experience. Means for indication of different types of parameter status, such as the battery status shown in FIG. 1, are still fairly simple. Furthermore, portable electronic devices may typically be placed or held in any orientation, and consequently the display may also be seen from different directions. In fact, there are different electronic devices that may be operated in different orientations. Examples of such devices include digital cameras and video cameras, where the present image detected by the camera is shown on the display of the camera. Other types information presented on the display simultaneously with the image, such as text messages, battery charge or memory level information etc, will than either have to be presented in an orientation where they are difficult to read for a user of the device, or they will have to be stepwise shifted from, for example, horizontal presentation to vertical presentation.

SUMMARY OF THE INVENTION

Some embodiments of the present invention provide a parameter status indicating device for use in an electronic device, which may satisfy the requirement for easily comprehensible and attractive solutions in a market where more and more complex devices are offered to technically non-skilled persons. Aspects of these embodiments of the present invention may provide a solution for indicating the status of a parameter which may assume a value between two endpoints, wherein a clear readout may be provided on a display in different orientations of the display.

According to some embodiments of the present invention, a parameter status indicating device is provided including a parameter-sensing unit devised to sense a parameter value, a display, a control unit devised to present an indicator area, defined within an indicator frame, on the display, wherein an area portion of the indicator area is marked to represent a relative parameter level associated with the parameter value and a gyro sensor connected to the control unit, wherein the control unit is devised to present the marked area portion as a bottom portion of the indicator area with a gyro-controlled upper border of the area portion.

In further embodiments of the present invention, the gyro sensor may be arranged to sense tilting about an axis perpendicular to a surface of the display, wherein the control unit is devised to indicate the upper border as substantially horizontal when the display is tilted about said axis.

In still further embodiments of the present invention, the control unit may be devised to present the marked area portion in a darker tone than the remaining indicator area inside the frame.

In some embodiments of the present invention, the control unit may be devised to present a moving waveform in the upper border.

In further embodiments of the present invention, the parameter-sensing unit may include a charge-sensing circuit connectable to a battery, and the parameter value is a battery charge value.

In still further embodiments of the present invention, the parameter-sensing unit comprises a memory occupation sensing circuit connectable to a data memory, and the parameter value is a measure of occupied memory space in the data memory.

In some embodiments of the present invention, the parameter-sensing unit comprises a computer program product sensing a computer game parameter, and the parameter value is a measure of a quality for an object forming part of the computer game.

In further embodiments of the present invention, forming part of an electronic device carrying said battery, the display is placed on a cover of the electronic device.

In still further embodiments of the present invention, an indicator frame may be fixed to the display and define the indicator area as the visible region of the display.

In some embodiments of the present invention, the control unit may be devised to present the indicator frame as a graphical element on the display.

Further embodiments of the present invention provide a portable electronic device including a parameter-sensing unit devised to sense a parameter value, a display, a control unit devised to present an indicator area, defined within an indicator frame, on the display, wherein an area portion of the indicator area is marked to represent a relative parameter level associated with the parameter value and a gyro sensor connected to the control unit, wherein the control unit is devised to present the marked area portion as a bottom portion of the indicator area with a gyro-controlled upper border of the area portion.

In some embodiments of the present invention, the gyro sensor may be arranged to sense tilting about an axis perpendicular to a surface of the display, wherein the control unit is devised to indicate the upper border as substantially horizontal when the display is tilted about said axis.

In further embodiments of the present invention, comprising a screen for presenting information to a user of the device, the display is separate from the screen and devised for presentation of the relative level of said parameter.

In still further embodiments of the present invention, the parameter-sensing unit comprises a charge-sensing circuit connectable to a battery, and the parameter value is a battery charge value.

In some embodiments of the present invention, the indicator frame is fixed to the display and defines the indicator area as the visible region of the display.

In further embodiments of the present invention, the control unit is devised to present the indicator frame as a graphical element on the display.

Still further embodiments of the present invention, a method for presenting parameter status information is provided. The method includes sensing a parameter value, presenting an indicator area, within an indicator frame, on a display, marking an area portion of the indicator area to represent a relative parameter level associated with the parameter value and presenting the marked area portion as a bottom portion of the indicator area with a gyro-controlled upper border of the area portion.

Some embodiments of the present invention include sensing tilting about an axis perpendicular to a surface of the display and indicating the upper border as substantially horizontal when the display is tilted about said axis.

Further embodiments of the present invention include presenting the marked area portion in a darker tone than the remaining indicator area.

Still further embodiments of the present invention include presenting a moving waveform in the upper level.

In still further embodiments of the present invention, said parameter may be a battery charge.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
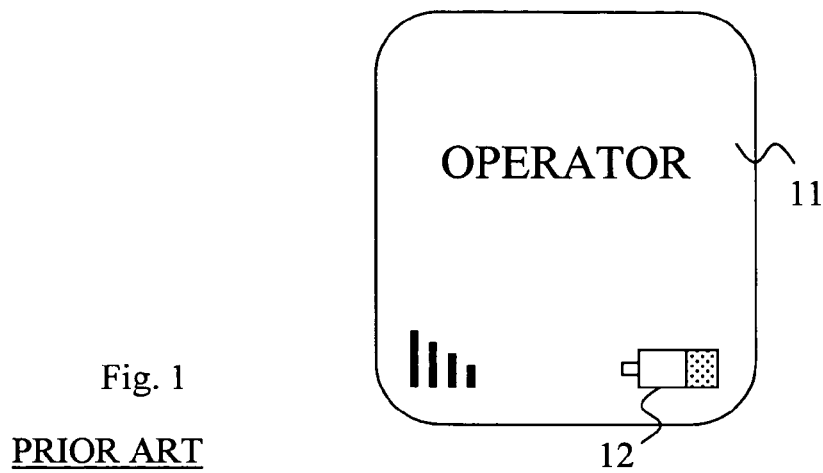
FIG. 1 schematically illustrates a display on which a battery charge level indicator is presented.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to block diagrams and/or flowchart illustrations of methods, apparatus (systems) and/or computer program products according to embodiments of the invention. It is understood that several blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Figure 2:
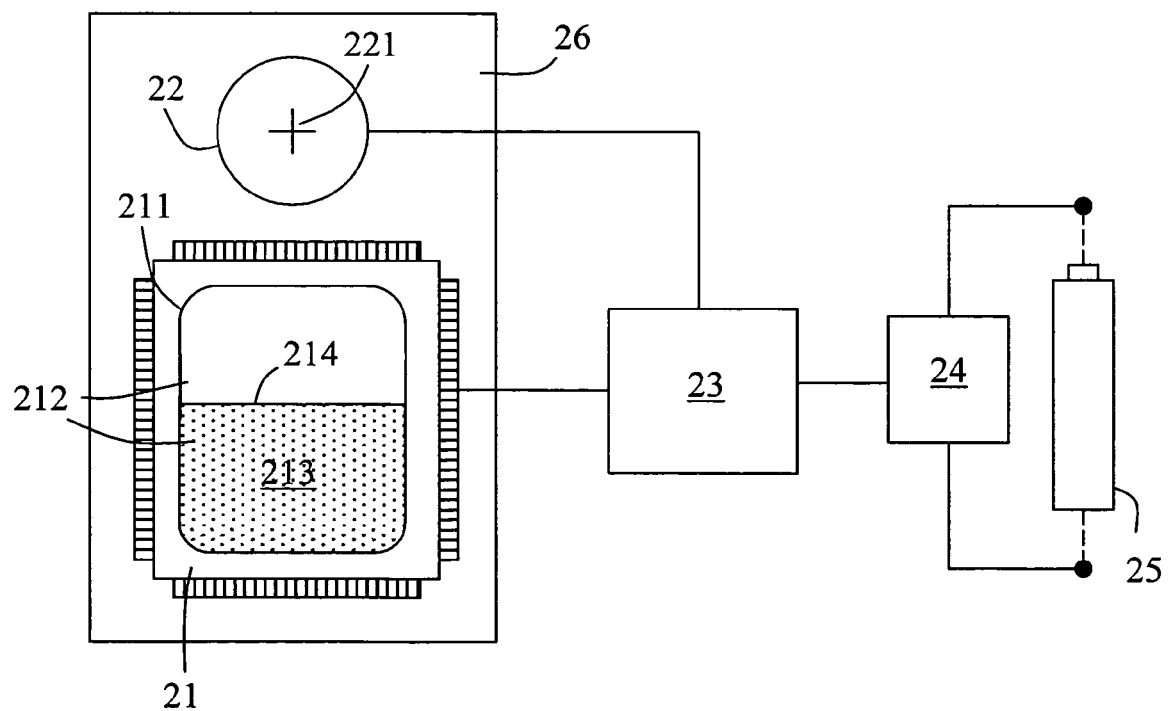
FIG. 2 is a schematic block diagram illustrating a parameter status indicating device according to some embodiments of the present invention.

FIG. 2 schematically illustrates a parameter status indicating device in accordance with some embodiments of the present invention, by means of which the basic principle behind the invention will now be explained. The drawing is block diagram, but it should be noted that the depicted elements are functional blocks and not necessarily separate physical elements. In the illustrated embodiment, the parameter status to be indicated is the battery charge level of a battery 25. For this purpose, a charge level sensor 24 is communicatively connectable to the poles of battery 25. The present charge in the battery may be detected by sensing the voltage provided by the battery and looking up a corresponding charge level value in a table. Alternatively, a current is passed from the battery into sensor 24, and the amount of charge drained from the battery may be integrated over time to provide a measure of the remaining charge in battery 25. The actual principle used for determining a value for the present charge in the battery is not crucial for the invention.

A control unit 23 is connected to sensor 24, and devised to present an indicator on a display 21 representing the present charge level as detected by sensor 24. Control unit 23 comprises a microprocessor with an associated memory space, operating system and application software. In order to accomplish easy understanding for a user, the present charge level is given as a relative value. The maximum capacity of battery 25 is known, and the detected present charge value may thus be given as an amount of the maximum charge capacity. Control unit 23 provides a graphical output on display, by controlling which pixels of the display 21 are activated or not activated, and potentially also by selection of colors.

According to some embodiments of the present invention, the status of the sensed parameter, in this example the charge level, is illustrated in an indicator area 210 defined within an indicator frame 211, on display 21. In some embodiments, the control unit 23 is devised to control the display to present the indicator frame 211 on the display. This embodiment is applicable when the display 21 is used also for presenting other types of information besides the status indication. In further embodiments, indicator frame 211 is a physical perimeter of display 21, such as an aperture of a cover placed over the display 21, so as to define the area inside indicator frame 211 as the only visible portion of the display 21. In such an embodiment, display 21 is used for presentation of the parameter status, and an electronic device incorporating the parameter status indicating device is then also devised with an auxiliary screen for presentation of other data. Examples of embodiments of the present invention will be described below. Indicator area 212, which is the total area within indicator frame 211, represents a measure of two endpoint values for the sensed parameter, i.e., the battery charge in this case. More specifically, a full indicator area 212 represents an upper parameter value, whereas an empty indicator area represents a lower parameter value. The indicator area may represent a sub-range of interest for the parameter in question, such that the parameter may take values of more than or less than the upper or lower endpoint values of that sub-range. In some embodiments of the present invention, the endpoints are in fact extreme values, i.e., the upper endpoint represents a maximum value and/or the lower endpoint represents a minimum value. In embodiments relevant for battery charge indication, the lower endpoint represents an empty battery and the upper endpoint represents a full battery, so in this case both endpoints are extreme values.

In order to indicate the present status of the parameter in question, an area portion 213 of the indicator area is graphically marked on the display 21. The control unit is configured to mark an area portion 213 having a relative size compared to the total area of indicator area 212, which represents the present relative parameter level in relation to the endpoint values. As an example, a present parameter value representing half ways between the endpoints may be indicated by marking half the indicator area, and for a present parameter value which is three quarters between the endpoints, closer to the upper endpoint, 75% of indicator area 212 may be marked as area portion 213.

A gyro sensor 22 is arranged in a fixed relation to display 21. This is functionally illustrated in the drawing by a box 26 supporting both display 21 and gyro sensor 22. Gyro sensor, or gyroscope, 22 is sensitive to rotation about at least one axis 221, which is perpendicular to the surface of display 21. Chip-mounted gyros are marketed by several manufacturers, such a series of gyros under the trademark iMEMS by Analog Devices®. The actual design of gyro sensor 22 is not of importance for understanding the invention. Gyro sensor 22 is communicatively connected to control 23 unit for providing control unit 23 with signals representing the rotational position of gyro sensor 22 about axis 221 relative a horizontal line. Furthermore, control unit 23 is devised to present the marked area portion 213 as a bottom portion of the indicator area 212, with a gyro-controlled upper border or level 214 of the area portion. In FIG. 1, display 21 and gyro sensor 22 are held in a horizontal orientation, and the marked area portion 213 will therefore be presented at the bottom of the indicator area 212. However, when the display 21 and gyro sensor 22 are tilted about axis 221, upper border 214 of the marked area portion will be controlled to remain horizontal, as will be illustrated with reference to FIGS. 3 to 8.

Figure 3:
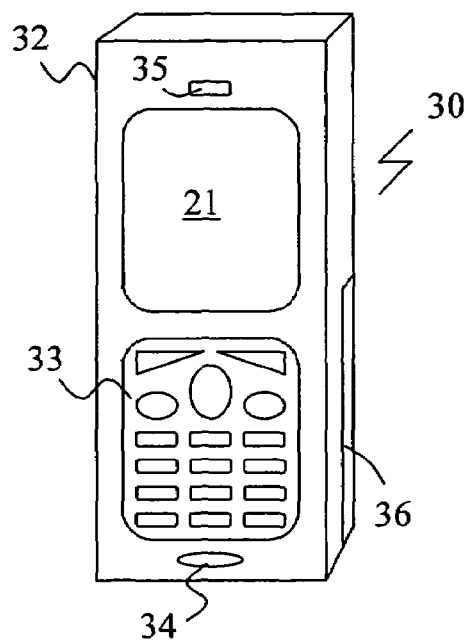
FIG. 3 is a block diagram illustrating an electronic device according to some embodiments of the present invention.

FIG. 3 shows an example of an electronic device on which the present invention may be applied, in this case in embodiments of a portable communication terminal 30, such as a mobile phone. The term portable communication terminal includes all mobile equipment devised for radio communication with a radio station, which radio station may also be a mobile terminal or for instance a stationary base station. Consequently, the term portable communication terminal includes mobile phones, pagers, communicators, electronic organisers, smart phones, PDAs (Personal Digital Assistants), vehicle-mounted radio communication devices or the like as well as portable laptop computers devised for wireless communication in for instance a WLAN (Wireless Local Area Network). The terminal 30 of FIG. 3 comprises a chassis or housing 32, carrying a user audio input in the form of a microphone 34 and a user audio output in the form of a speaker 35 or a connection to an ear piece (not shown). A set of keys, buttons or the like constitutes a data input interface 33 useable for instance for dialing according to the established art. The data output interface or data presentation means comprises a display 21 devised to present communication information to a terminal user by use of a graphical user interface. The terminal further includes radio transmitter and receiver means and an antenna (not shown) for conveying radio signals. In order to provide power to the terminal, a battery 36 is either included in or releasably attachable to the chassis.

Figure 4A:
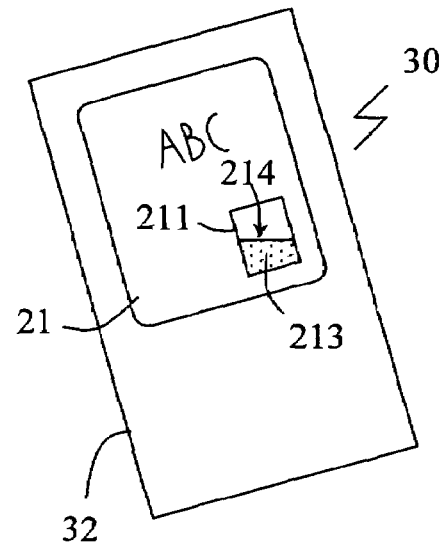
FIGS. 4A through 4C are schematic block diagrams illustrating electronic devices according to some embodiments of the present invention in different orientations.
Figure 4B:
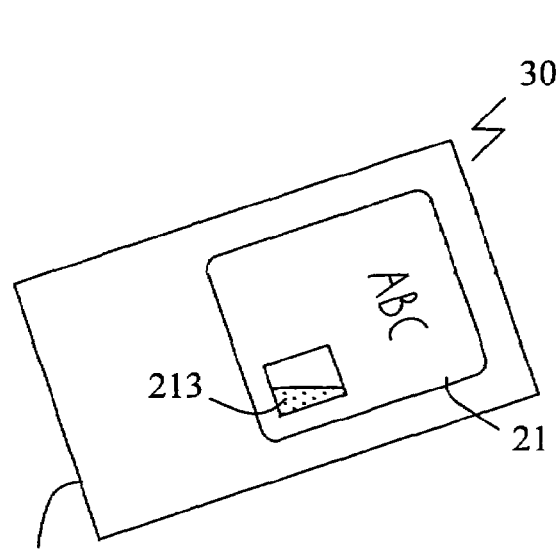
Figure 4C:
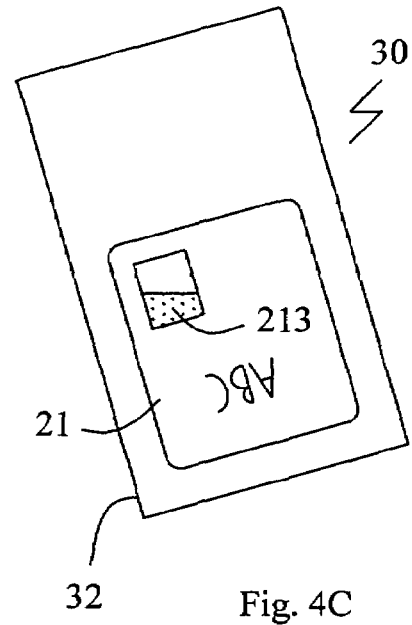

FIGS. 4a to 4C show the electronic device 30 of FIG. 3, devised in accordance with some embodiments of the present invention. In FIGS. 4A to 4C only the body or chassis 32 of the device, and the display 21, are shown for the sake of simplicity, whereas other features are typically included, such as those described with reference to FIG. 3. Furthermore, electronic device 30 includes a parameter status indicating device as explained with reference to FIG. 2, devised for sensing a presenting a relative level for a parameter. In these embodiments, a portion of display 21 is used for indicating the parameter status, in that indicator frame 211 occupies only a portion of the visible surface of display 21. Other portions of display 21 are used for presenting other information, exemplified in the drawing by letters ABC.

In FIG. 4A, electronic device 30 is depicted in an orientation where display 211 is not held horizontally, but tilted slightly to the left. However, control unit 22 will, by means of signals received from gyro sensor 22, control display 21 to present an indication of the status for the parameter sensed by parameter sensor 24 as a bottom area portion 213 with an upper level 214 which is controlled to be substantially horizontal. Correspondingly, FIG. 4B illustrates the same electronic device 30 tilted far to the right, so that the marked area portion 213 is situated along a right hand side of the indicator frame with a horizontal upper level 214. FIG. 4C illustrates device 30 held more or less upside down at a slight angle from a reversed vertical orientation. Still, control unit 23 controls presentation of the present status of the sensed parameter as a marked lower area portion 213, with reference to the horizon.

As a result, the marked area portion 213 will provide a fluid experience, wherein the marked portion will be experienced as a fluid contained in a jar defined by the indicator frame 211. This way of presenting the present status of a parameter is relatively easy to grasp for a user, since it resembles something every person readily understands, namely the difference between a full and an empty container, and any level there between.

Figure 5:
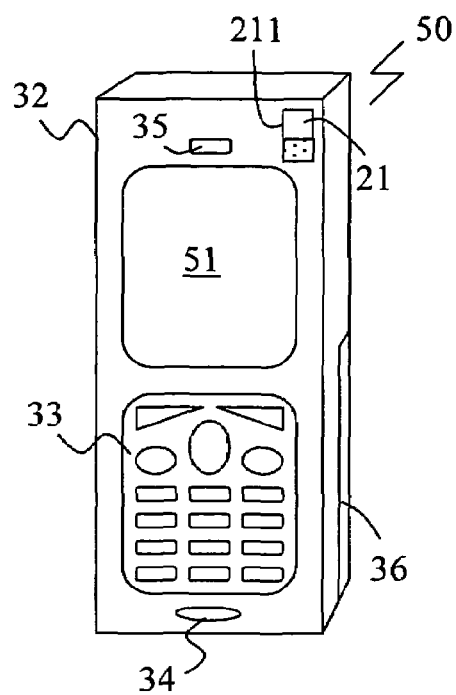
FIG. 5 is a block diagram illustrating an electronic device according to some embodiments of the present invention.

FIG. 5 illustrates an electronic device 50, which mainly corresponds to the electronic device 30 of FIG. 3. One difference is that electronic device 50 has a main display screen 51, used for presentation of information to a user. Typically, display screen 51 is used as an output interface and for presenting symbols or signs which are input by a user by means of input interface 33, according to the established art. A cursor control device of the input interface 33 is also operable for steering a cursor over the surface of the display screen 51 for selecting presented items in menus or images. Display screen 51 may also be touch-sensitive, thereby also forming part of the user input interface. Display 21, on the other hand, is a pure indicator display solely used for presentation of a relative parameter level, according to the invention, as explained with reference to FIG. 2. The parameter status indicating device of FIG. 2 is therefore included also in the electronic device 50 of FIG. 5. Not all elements of FIG. 2 are shown in FIG. 5, for the sake of simplicity, but it may be noted that in this embodiment of the invention indicator frame 211 defines a perimeter for the visible region of display 21. As such, indicator frame 211 may in this case be an aperture in a cover for the electronic device 50. In one version of this embodiment, display 21 is always activated to present a marked area portion reflecting the present level of the parameter in question, or a latest measurement value of the parameter. This embodiment is advantageous for electronic devices where the main display screen 51 is automatically faded, turned off, or a screen saver function is configured to take over, after a predetermined time. This way, the status of the parameter may still be read by viewing the separate indicator display 21, which may be used for presenting e.g. the present charge of battery 36.

Figure 6:
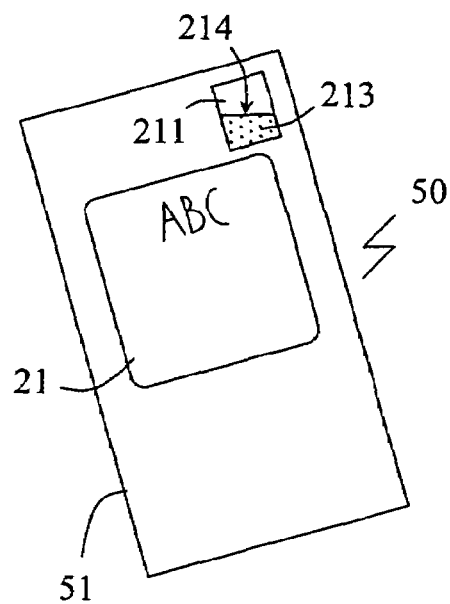
FIG. 6 is a schematic block diagram illustrating an electronic device according to some embodiments of the present invention.

FIG. 6 schematically illustrates electronic device 50 when held in a tilted orientation. As described above with reference to FIGS. 2-4, control device 23 will still act to present the marked area portion 213 as a bottom portion within indicator frame 211, with a substantially horizontal upper level 214.

Figure 7:
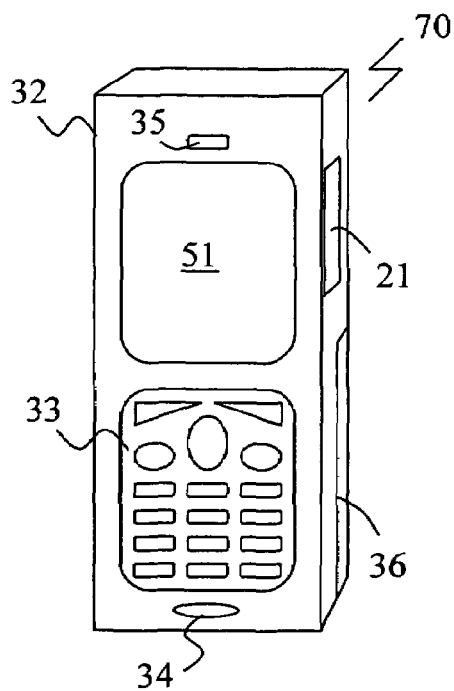
FIGS. 7 and 8 are schematic block diagrams illustrating different views of an electronic device having an indicator according to some embodiments of the present invention on a side of the electronic device.
Figure 8:
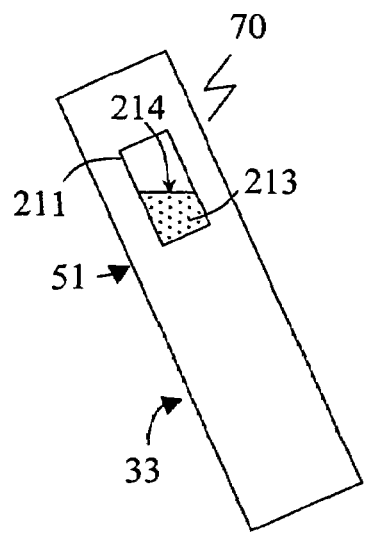

FIG. 7 illustrates an electronic device 70, which is an alternative to the design of FIG. 5, where separate indicator display 21 is provided on a side of the electronic device, substantially perpendicular to the main display screen 51. Another difference from the embodiment of FIGS. 5 and 6 is therefore that also the gyro sensor 23 is also turned such that axis 221 is parallel to the normal direction of the surface of indicator display 21. FIG. 8 illustrates electronic device 70 from the side, tilted from a vertical orientation. Using input signals from gyro sensor 24, control unit 23 still controls presentation of the marked area portion as a bottom portion within indicator frame 211, with a horizontal upper border level 214.

Figure 9A:
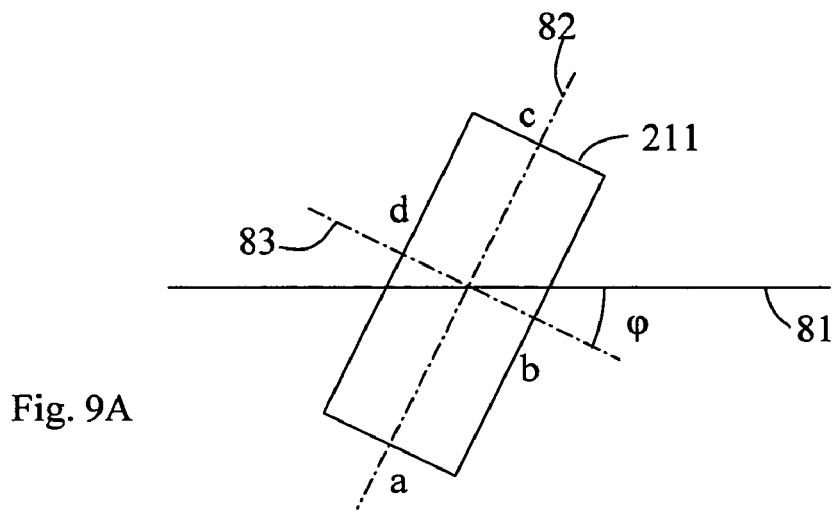
FIGS. 9A through 9C are diagrams illustrating orientations of devices according to some embodiments of the present invention.

One way of controlling presentation using of a parameter status in accordance with the present invention will now be described with reference to FIGS. 9A through 9C and 10. In FIG. 9A an indicator frame 211 is shown in a tilted orientation with reference to a horizontal level 81, which is sensed by gyro sensor 24. In this case, indicator frame 211 has a simple rectangular shape. Other shapes may be used, but as long as they are symmetric about both a lengthwise centre axis 82 and a transverse centre axis 83, the basic principle described here can be used. However, if the indicator frame is narrower at the ends than at the middle, or vice versa, the relative area portion under a certain level will not be linearly dependent of the level height, which makes calculations more complex. If a substantially rectangular shape with rounded corners are used, as shown in FIG. 2, it may be treated as a rectangle since it is an indication of the parameter level which is intended to be presented rather than a precise level value.

The indicator frame 211 of FIG. 9A has four sides, denoted a, b, c, and d. An orientation angle φ is given by gyro sensor 22, representing a tilt angle for an object holding the display within indicator frame 211. As long as angle φ is less than 90°, side a will be considered to be the bottom side of indicator frame 211. As the tilt angle increases, sides b, s, and finally d, will be considered to represent the bottom side. When the bottom side is selected, a baseline is specified for determining the area portion to be marked. In the example of FIG. 9A, the angle φ is between 0 and 90°, and therefore side a is determined to be the baseline.

A relative parameter level is given by parameter sensor 24, and its magnitude relative the endpoints represented by an empty frame and a full frame, is calculated by control unit 23. The relative parameter level is then transformed into a relative linear level along the axis passing through the selected baseline. As an example, if the lower endpoint is x, the upper endpoint is y, and the sensed parameter value (having a value between x and y) is z, then the relative parameter level is $(z-x)/(y-x)$. The relative parameter level has a value between 0 and 1, and by combining this measure with the height of indicator frame 211 from the selected baseline, a linear level point is defined at a height h from the baseline along the axis passing through that baseline. This is illustrated in FIG. 9B.

Figure 9B:
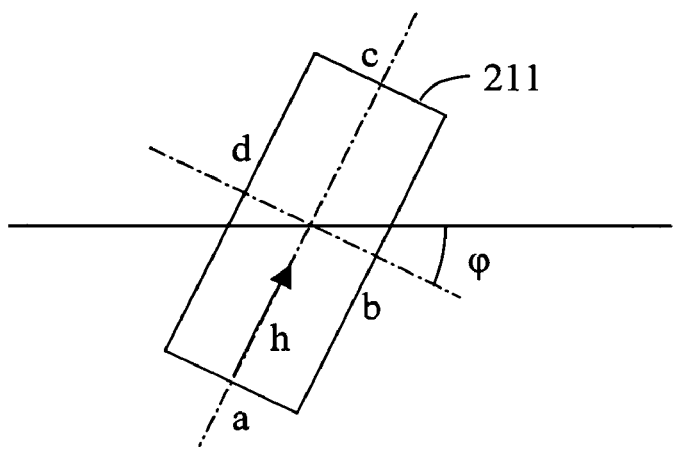
Figure 9C:
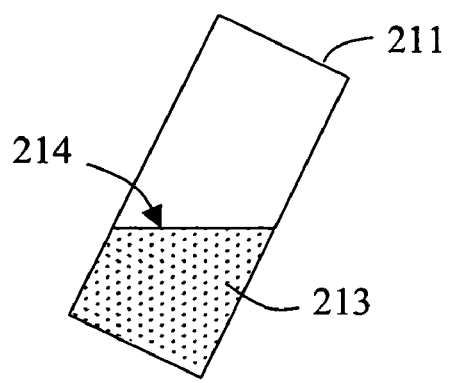

Finally, an upper level is drawn horizontally through the linear level point as shown in FIG. 9C, and the area portion underneath that upper level is marked to represent a measure of the sensed parameter.

In order to make the presentation more interesting for a viewer, a ripple or a moving wave may be provided in the still substantially horizontal surface. Furthermore, some extent of inertia may be incorporated in the presentation control performed by control unit 23, such that upon tilting of the device the upper level 214 will assume a horizontal line with some delay and potentially also oscillate to an horizontal line, to increase the fluid experience.

Figure 10:
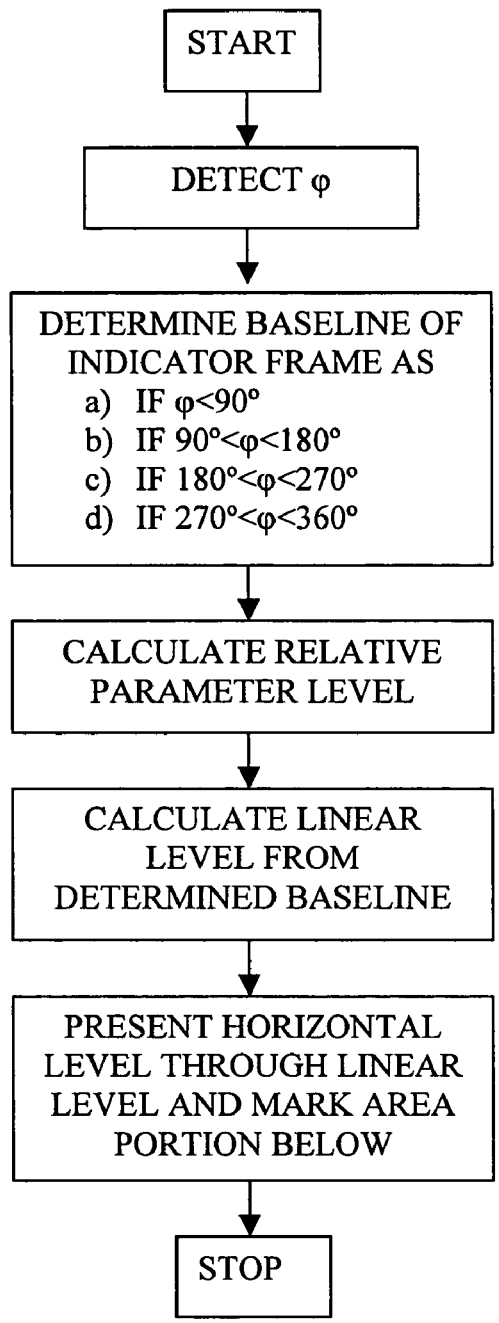
FIG. 10 is a flowchart illustrating operations in accordance with some embodiments of the present invention.

FIG. 10 illustrates a flowchart for how to present the parameter indication according to an embodiment of the invention, where reference is also made to FIGS. 9A-9C. According to the process shown in FIG. 10, the following steps are included in this embodiment.

First a tilt angel φ is determined using gyro sensor 22. Not only angle but also direction of the angle needs to be determined, such that it is possible to separate tilting to the left from tilting to the right.

From the sensed value of the tilt angle φ, it is determined which side of the indicator frame to be used as a baseline. In principle, from the lowermost corner of the indicator frame, the side which deviates the least from the horizontal line is selected as the baseline.

Furthermore, the parameter value in question is sensed, and the corresponding relative parameter level with reference to the endpoints represented by full and empty indicator area is calculated. It should be noted that sensing of the parameter value and calculation of the relative parameter level may likewise be performed prior to or simultaneously with the steps carried out to determine baseline.

From the relative parameter level, a height h from the determined baseline is calculated along the centre axis passing through that baseline.

Finally, through the point where that height h ends a horizontal level or border 214 is presented, and the area portion 213 underneath the horizontal level is graphically marked within indicator frame 211.

The foregoing has described the principles, preferred embodiments and modes of operation of the present invention. However, the above described embodiments should be regarded as illustrative rather than restrictive, and it should be appreciated that variations may be made in those embodiments by persons skilled in the art.

What is claimed is:

1. A parameter status indicating device, comprising:
 a parameter-sensing unit devised to sense a parameter value;
 a display;
 a control unit devised to present an indicator area, defined within an indicator frame, on the display, wherein an area portion of the indicator area is marked to represent a relative parameter level associated with the parameter value; and
 a gyro sensor arranged to sense tilting about an axis perpendicular to a surface of the display, wherein the gyro sensor is communicatively connected to the control unit for providing the control unit with signals representing the rotational position of the gyro sensor and wherein the control unit is devised to present the marked area portion as a bottom portion of the indicator area with a gyro-controlled upper border of the area portion and to indicate the upper border as substantially horizontal when the display is tilted about said axis.

2. The parameter status indicating device of claim 1, wherein the control unit is devised to present the marked area portion in a darker tone than the remaining indicator area inside the frame.

3. The parameter status indicating device of claim 1, wherein the control unit is devised to present a moving waveform in the upper border.

4. The parameter status indicating device of claim 1, wherein the parameter-sensing unit comprises a charge-sensing circuit connectable to a battery, and the parameter value is a battery charge value.

5. The parameter status indicating device of claim 4, forming part of an electronic device carrying said battery, wherein the display is placed on a cover of the electronic device.

6. The parameter status indicating device of claim 1, wherein the parameter-sensing unit comprises a memory occupation sensing circuit connectable to a data memory, and the parameter value is a measure of occupied memory space in the data memory.

7. The parameter status indicating device of claim 1, wherein the parameter-sensing unit comprises a computer program product sensing a computer game parameter, and the parameter value is a measure of a quality for an object forming part of the computer game.

8. The parameter status indicating device of claim 1, wherein the indicator frame is fixed to the display and defines the indicator area as the visible region of the display.

9. The parameter status indicating device of claim 1, wherein the control unit is devised to present the indicator frame as a graphical element on the display.

10. A portable electronic device, comprising:
 a parameter-sensing unit devised to sense a parameter value;
 a display;
 a control unit devised to present an indicator area, defined within an indicator frame, on the display, wherein an area portion of the indicator area is marked to represent a relative parameter level associated with the parameter value; and
 a gyro sensor arranged to sense tilting about an axis perpendicular to a surface of the display, wherein the gyro sensor is communicatively connected to the control unit for providing the control unit with signals representing the rotational position of the gyro sensor and wherein the control unit is devised to present the marked area portion as a bottom portion of the indicator area with a gyro-controlled upper border of the area portion and to indicate the upper border as substantially horizontal when the display is tilted about said axis.

11. The portable electronic device of claim 10, comprising a screen for presenting information to a user of the device, wherein the display is separate from the screen and devised solely for presentation of the relative level of said parameter.

12. The portable electronic device of claim 10, wherein the parameter-sensing unit comprises a charge-sensing circuit connectable to a battery, and the parameter value is a battery charge value.

13. The portable electronic device of claim 10, wherein the indicator frame is fixed to the display and defines the indicator area as the visible region of the display.

14. The portable electronic device of claim 10, wherein the control unit is devised to present the indicator frame as a graphical element on the display.

15. A method for presenting parameter status information, comprising:

sensing a parameter value;
presenting an indicator area, within an indicator frame, on a display;
marking an area portion of the indicator area to represent a relative parameter level associated with the parameter value;
sensing tilting about an axis perpendicular to a surface of the display;
presenting the marked area portion as a bottom portion of the indicator area with a gyro-controlled upper border of the area portion; and
indicating the upper border as substantially horizontal when the display is tilted about said axis.

16. The method of claim 15, comprising:
presenting the marked area portion in a darker tone than the remaining indicator area.

17. The method of claim 15, comprising:
presenting a moving waveform in the upper level.

18. The method of claim 15, wherein said parameter is a battery charge.

* * * * *